Nov. 20, 1923.

R. W. DEARDORFF 1,474,408

DETECTING CIRCUIT

Filed Nov. 16, 1920   3 Sheets-Sheet 1

INVENTOR
R.W. Deardorff
BY
ATTORNEY

Nov. 20, 1923.

R. W. DEARDORFF

DETECTING CIRCUIT

Filed Nov. 16, 1920

1,474,408

3 Sheets-Sheet 2

INVENTOR
R. W. Deardorff
BY
ATTORNEY

Nov. 20, 1923.

R. W. DEARDORFF 1,474,408

DETECTING CIRCUIT

Filed Nov. 16, 1920   3 Sheets-Sheet 3

INVENTOR
R. W. Deardorff
BY
ATTORNEY

Patented Nov. 20, 1923.

1,474,408

UNITED STATES PATENT OFFICE.

RALPH WARNER DEARDORFF, OF BROOKLYN, NEW YORK, ASSIGNOR TO AMERICAN TELEPHONE AND TELEGRAPH COMPANY, A CORPORATION OF NEW YORK.

DETECTING CIRCUIT.

Application filed November 16, 1920. Serial No. 424,503.

*To all whom it may concern:*

Be it known that I, RALPH W. DEARDORFF, residing at Brooklyn, in the county of Kings and State of New York, have invented certain Improvements in Detecting Circuits, of which the following is a specification.

This invention relates to receiving apparatus and more particularly to receiving apparatus to be used in connection with transmission systems in which carrier currents are employed.

One of the objects of this invention is to provide a detector circuit for use in connection with a system for transmitting signals such as telegraphic signals by means of a high frequency carrier transmitted either over wires or through the ether, the detecting circuit being of such character that a polar relay may be used for recording the signals. Another object of the invention is to provide a detecting circuit of the character above specified, the circuit being so organized that a very snappy relay action will be obtained.

Figure 1:
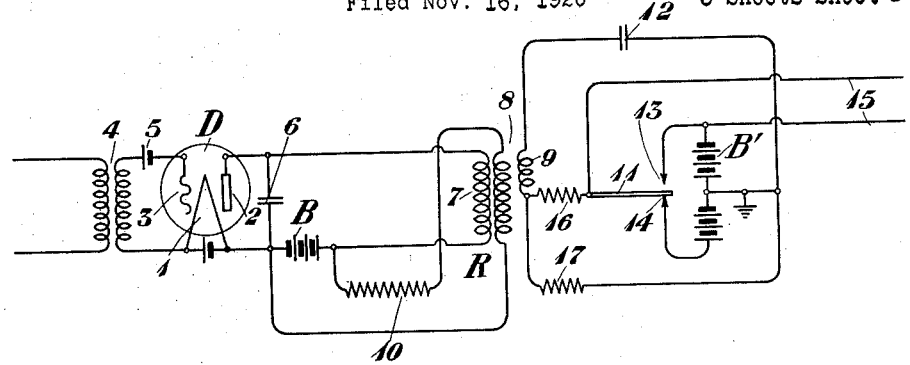
Figure 5:
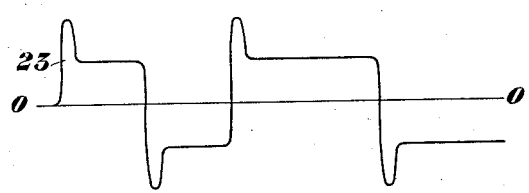
Figure 6:
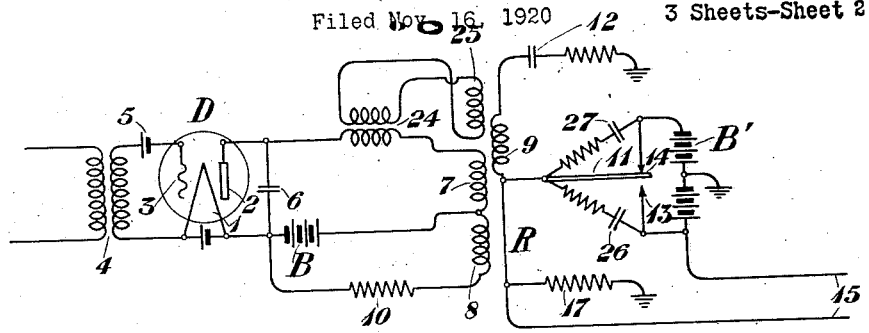
Figure 12:
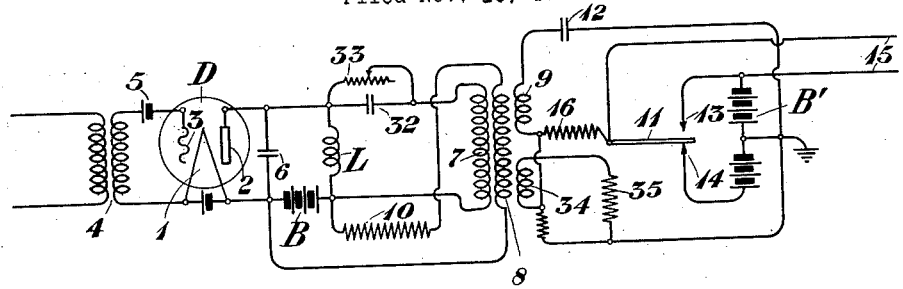

These objects, as well as other objects of the invention, may be realized by means of the arrangements set forth in the following description and illustrated in the accompanying drawing, in which Figures 1, 6 and 12 illustrate circuit diagrams embodying different modifications of the invention, while Figs. 2 to 5 inclusive, 7 to 11 inclusive and 13 to 18 inclusive show curves illustrating certain features of the operation of the apparatus. Referring to Fig. 1, D designates a vacuum tube detector comprising a filament 1, a plate 2 and a controlling electrode or grid 3. The input circuit of the detector is connected between the filament 1 and the grid 3 to the secondary winding of the transformer 4, through which carrier currents modulated in accordance with the telegraphic or other signals may be impressed upon the tube. The output circuit is connected between the filament 1 and the plate 2 and is connected to a specially constructed polar relay R, the usual source of space current B being provided. In order to by-pass currents of carrier frequency appearing in the output circuit of the tube, a condenser 6 is shunted across the output circuit of the tube, the capacity of this condenser being comparatively high so that it offers a path of low impedance to carrier frequencies, while its impedance with respect to currents of signaling frequency is quite large.

The polar relay R is provided with three windings 7, 8 and 9. The winding 7 is the main winding or operating winding of the relay and is connected directly through the source B to the filament 1 and the plate 2. The winding 8 is a biasing winding and is connected through a resistance 10 to the terminals of the battery B, so that the winding 8 is connected in parallel circuits with the circuit of winding 7. The winding 9 is a condenser discharge winding provided for the purpose of giving a sharp "kick" to the armature 11 of the polar relay, so that a snappy action results. The condenser 12 is connected in circuit with the winding 9 of the polar relay and by its discharge energizes winding 9 for the purpose just stated. The charge and discharge of the condenser 12 is controlled by the armature 11 through its contacts 13 and 14, which are connected to the terminals of a battery B' grounded at its middle point. When the armature rests upon contact 14 all of the cells of battery B' are connected over the armature 11 serially in the local receiving circuit 15, and the lower half of the battery B' is connected over the armature 11 and through the resistance 16 and winding 9 of the polar relay to charge the condenser 12 in one direction. When the armature 11 rests against contact 13, the local circuit 15 is short-circuited and the upper half of the battery B' is connected over the armature 11 and through resistance 16 and winding 9 to charge the condenser 12 in the opposite direction. A resistance 17 may be connected in parallel with the winding 9 and the condenser 12, as shown, to regulate the amount of current flowing to charge the condenser and to determine that the major part of the discharge takes place at the end of the impulse instead of the beginning.

Figure 2:
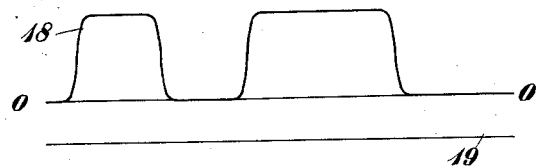

The operation is as follows:

With the circuit in normal condition and no carrier currents being received the potential of the grid 3 is adjusted by means of the source 5 in a well known manner, so that no current flows between the filament and the plate and consequently no current flows through the winding 7. When the modulated carrier is impressed upon the transformer 4 the potential of the grid 3 is varied and the tube D operates in a well known manner to detect the signaling current, in accordance with which the carrier was modulated. As a result current pulses corresponding to the original signal pulses flow through the winding 7 of the polar relay, while currents of carrier frequency appearing in the output circuit at the same time are shunted through the condenser 6. The pulses of current corresponding to the original signal pulses will assume the general form indicated by the curve 18 of Fig. 2, which illustrates pulses representing a dot and a dash. The resistance 10 is so adjusted that a steady direct current flows at all times through the winding 8 having a value equal to about half of the maximum amplitude of the signal pulses, the polarity of this current, however, being opposite to that of the pulses. The steady current flowing through the winding 8 is indicated by the curve 19 of Fig. 2. The steady current through the winding 8 operates to bias the armature 11 of the polar relay in one direction, so that it normally is in contact with contact 14, for example, and the condenser 12 is charged to a polarity determined by the lower half of battery B'. When a pulse, such as indicated in Fig. 2, flows through the winding 7, however, the pull on the armature is in the opposite direction, so that the armature 11 is to be shifted to the contact 13. The effective pull on the armature due to the windings 7 and 8 will be as indicated by the curve 20 of Fig. 3, this curve being the resultant of the curves 18 and 19.

Figure 3:
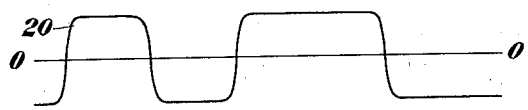

As soon as the armature 11 leaves the contact 14, the condenser 12 discharges through the winding 9 and the direction of this discharge is such that the winding 9 assists in pulling the armature 11 over to the contact 13. When the condenser 12 is charged in the opposite direction by the upper half of the battery B', the current flowing to charge the condenser passes through the winding 9 in the same direction as the previous discharge. The effect of the sudden discharge of the condenser 12 is to produce a sharp "kick" such as indicated at 21 in Fig. 4 at the beginning of the pulse flowing through the winding 7, so that an additional impetus is given to the armature 11 to shift it to the contact 13. At the end of the pulse, as indicated by the curve of Fig. 3, the winding 8 comes into play to pull the armature in the opposite direction, and as the armature leaves the contact 13, the charge of the condenser 12, which was determined by the upper half of the battery B', discharges through the winding 9 in such a direction as to produce a sharp "kick" to assist in carrying the armature 11 to the contact 14. This "kick" is indicated at 22 in Fig. 4.

Figure 4:
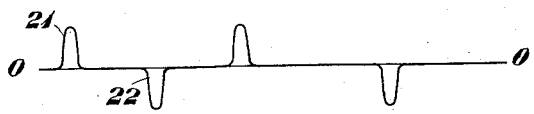

If the curve of Fig. 4 be combined with the curve of Fig. 3, the curve 23 of Fig. 5 results. This curve represents the combined magnetic action of the windings 7, 8 and 9. It will be seen from an inspection of the curve that a sharp "kick" occurs at the beginning of the signal pulse to carry the armature to its other contact, and after reaching the contact a moderate steady state pull continues until the end of the signal impulse to hold the armature against the opposite contact. At the end of the impulse a sharp "kick" occurs in the opposite direction, which carries the armature to its normal contact, where it is held by a steady state pull of lesser magnitude. The vibration of the armature 11 to and fro, of course, relays the received signals to the local circuit 15.

Fig. 6 illustrates an arrangement somewhat similar to that of Fig. 1, but differing therefrom in that the alternating current component of the signal pulse is utilized to give an additional impetus to the armature in shifting it from one contact to the other. In order to obtain this result a transformer 24 is included in the output circuit to inductively associate a further winding 25 of the polarized relay with the output circuit. The other features of the circuit are similar to those already described in connection with Fig. 1, except that condensers 26 and 27 are shunted about the contacts 13 and 14 for the purpose of preventing sparking at the contact points.

Figure 7:
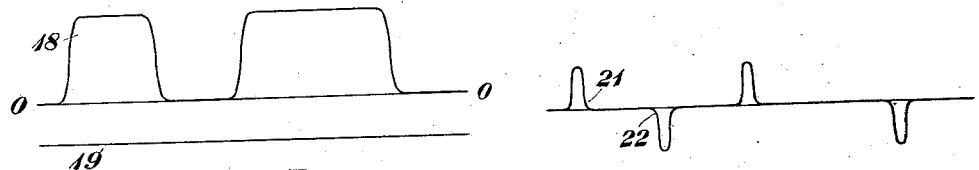
Figure 10:
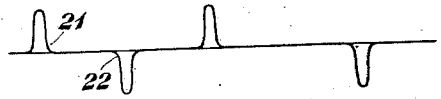
Figure 8:
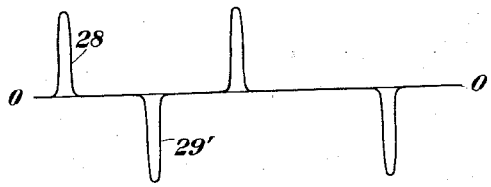
Figure 11:
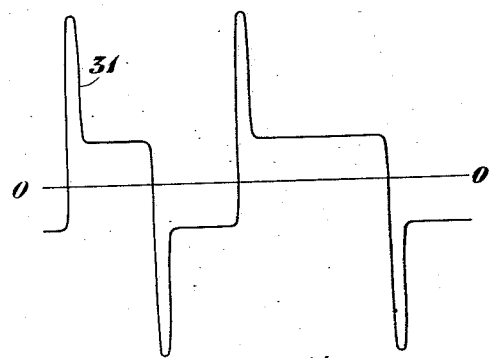
Figure 9:
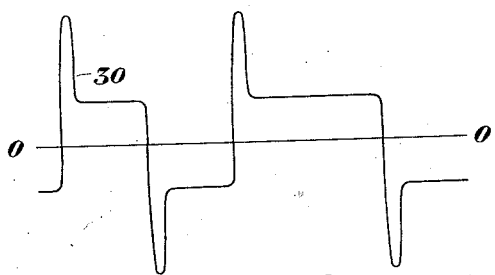

The operation is as follows:

Normally only the winding 8 is energized by the current flowing through the resistance 10, as indicated by the curve 19 of Fig. 7. Signal impulses flow through the winding 7 as indicated by the curve 18 of Fig. 7. The change in the current strength as the pulse rises from zero to its maximum value at the beginning of the pulse induces an alternating impulse through the transformer 24 in the winding 25 as indicated at 28 in Fig. 8. At the end of the pulse, as the current falls off, an alternating impulse occurs as indicated at 29 of Fig. 8. The resultant magnetic pull upon the armature of the polar relay due to the windings 7, 8 and 25 is indicated by the curve 30 of Fig. 9, which curve is the result of combining the curves of Figs. 7 and 8. As the armature leaves contact 14 in response to the initial "kick" of the signal pulse, the condenser 12 discharges to produce an impulse such as 21 of Fig. 10, as described in connection with Fig. 1. At the end of the pulse, as the armature leaves the contact 13, the pulse 22 occurs in the opposite direction. These pulses, as already described, flow through the winding 9 in such a direction as to assist the armature in the direction in which it has started. If this effect be added to the effect produced by the other three windings of the relay, the total pull on the armature under varying conditions will be as indicated by the curve 31 of Fig. 11, which is the resultant of combining the curves of Figs. 9 and 10. It will be seen from this curve that at the beginning of each signaling impulse the armature is given a very sharp "kick" to carry it to its opposite contact, after which a steady state pull of relatively small magnitude holds the armature in the shifted position. At the end of the pulse a sharp "kick" occurs in the opposite direction followed by a steady state pull to hold it in its original position.

Fig. 12 illustrates a third modification, which differs from those previously described in that the alternating component of the signal pulse is obtained by means of a condenser in the output circuit without the provision of an additional relay winding, as required by Fig. 6, the additional winding in this case being utilized as a holding winding to assist in holding the armature to the position to which it has been shifted. The condenser for impressing the alternating component of the signal pulse upon the winding 7 is illustrated at 32 and is included in series with the winding 7. This condenser offers a very low impedance to the low frequency alternating currents, such as currents of the signal dot frequency and the principal harmonics thereof. In this modification of the invention the full direct current component is not utilized, and consequently the inductance L is bridged across the output circuit to provide a bypath for the major portion of the direct current component. This inductance offers a large impedance to the alternating component so that the latter finds a path through the condenser 32 to the winding 7. A resistance 33 may be connected in parallel with the condenser 32 in order to allow a small direct current component to flow through the winding 7 during the continuance of the signaling impulse. A locking winding 34 is provided for the purpose of assisting in holding the armature in its shifted position. This winding is connected through a resistance 35 to the ground tap of the battery B', its opposite terminal being connected through the resistance 16 to the armature 11, so that with the armature 11 resting against the contact 14 the current flows through the winding 34 in one direction, and when the contact 11 rests against the contact 13 current flows through the winding in the opposite direction. The directions of flow in each instance is such that the magnetic pull induced in the winding tends to hold the armature in the position in which it is then resting.

Figure 13:
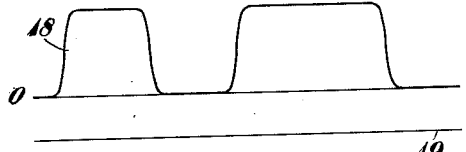
Figure 14:
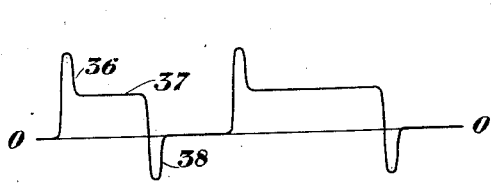

The operation is as follows:

Normally a steady current flows through the biasing winding 8 as indicated by the curve 19 of Fig. 13. The detected signal impulse flowing from the filament 1 to the plate 2 may be represented by the curve 18 of Fig. 13. Since the condenser 32 only passes the alternating component of the pulse, and the inductance L and resistance 33 only permits a small part of the direct current component to pass through the winding 7, the actual current flowing through said winding will be as indicated by the curve of Fig. 14, which shows an alternating impulse 36 at the beginning of the signal pulse followed by a steady flow of direct current of small amplitude during the continuance of the pulse, as indicated at 37. At the end of the signal pulse an alternating impulse in the opposite direction occurs as shown at 38.

Figure 16:
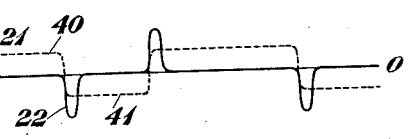
Figure 17:
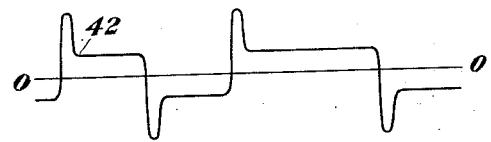
Figure 15:
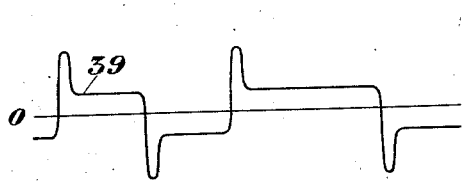
Figure 18:
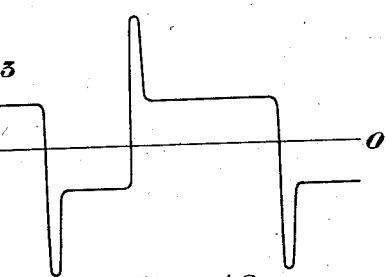

The forces acting on the armature 11 due to the windings 7 and 8 may then be represented as indicated by the curve 39 of Fig. 15. The action of the condenser 12 through the winding 9 will be the same as in the case of Fig. 6, so that a brief surge of current occurs at the beginning of the impulse when the armature leaves the contact 14 as indicated at 21, this surge of current assisting in carrying the armature over to the contact 13. A similar surge of current in the opposite direction occurs at the end of the signal impulse as the armature leaves the contact 13. Furthermore, after the armature passes to the contact 13, a steady flow of current flows through the winding 34 in such a direction as to hold the armature in its shifted position, this effect being indicated in Fig. 16 by the dotted line curve 40. After the armature has been restored to contact 14, a similar steady flow of current occurs through the winding 34 as indicated by the curve 41 of Fig. 16. The resultant forces acting upon the armature due to the windings 9 and 34 will be somewhat as indicated by the curve 42 of Fig. 17. It will be observed that the curve of Fig. 17 is similar to that of Fig. 13, so that the results produced by the windings 9 and 34 are similar to those produced by the windings 7 and 8 and the effect is cumulative. The total forces acting upon the armature may be obtained by combining the curves of Figs. 15 and 17 as indicated by the curve 43 of Fig. 18.

It will be seen, by means of the arrangements previously described, a very snappy relay action may be obtained. It will also be obvious that the general principles herein disclosed may be embodied in many other organizations widely different from those illustrated without departing from the spirit of the invention as defined in the following claims.

What is claimed is:

1. A receiving apparatus comprising a detector for translating carrier frequencies above which signals are superposed into signaling currents, a polarized relay controlled thereby, said relay having a plurality of windings, one of said windings being in circuit with said detector in order that the armature of said relay may be shifted in response to detected signal pulses, and means to produce a condenser discharge through another of said windings to quicken the action of said armature.

2. A receiving apparatus comprising a detector for translating carrier frequencies above which signals are superposed into signaling currents, a polarized relay controlled thereby, said relay comprising a plurality of windings, one of which is in circuit with said detector, so as to initiate a movement of said armature in response to detected signal pulses, a condenser in circuit with another of said windings, means to charge said condenser over a normal contact of the armature of said relay, the discharge of said condenser becoming effective as the armature leaves said contact to give additional impetus to its movement toward the other contact, means to charge said condenser in the opposite direction when the armature is on the other contact, the discharge of the condenser in the opposite direction becoming effective when the armature leaves the other contact to hasten its movement toward the normal contact.

3. A receiving apparatus comprising a detector for translating carrier frequencies above which signals are superposed into signaling currents, a polarized relay controlled thereby and having a plurality of windings, one of said windings being in circuit with said detector, so that the armature of said relay may be vibrated in response to detected signal pulses, means to select the alternating current component of a detected pulse and impress said component upon a winding of said relay to increase the force tending to shift the armature at the beginning and end of each pulse; and means to cause a condenser discharge through another winding of said relay at the beginning and end of each pulse in order to hasten the movement of the armature.

4. A receiving apparatus comprising a detector, a polarized relay controlled thereby and having a plurality of windings, one of said windings being in circuit with said detector so that the armature of said relay may be vibrated in response to detected signal pulses, means to select the alternating current component of a detected pulse and impress said component upon a winding of said relay to increase the force tending to shift the armature at the beginning and end of each pulse, a condenser in circuit with another of said windings, means to charge said condenser when the armature rests upon its normal contact, the discharge of said condenser passing through said winding as the armature leaves its normal contact to hasten its movement toward the other contact, means to charge the condenser in the opposite direction when the armature rests upon the other contact, the discharge of the condenser through said winding as the armature leaves the other contact acting to hasten the movement of the armature to its normal contact.

5. A receiving apparatus comprising a detector, a polar relay controlled thereby, said relay having a plurality of windings, one of which is in circuit with said detector, in order to initiate the vibration of the armature of said relay in response to detected signal pulses; means to select the alternating current component of a detected pulse and impress the energy of said component upon the winding of said relay in order to cause a distinct "kick" tending to shift the armature at the beginning and end of each pulse, and means controlled by the armature of said relay to energize another winding of said relay to produce a holding force tending to maintain the armature in the position to which it has been shifted.

6. A receiving apparatus comprising a detector, a polarized relay controlled thereby, said relay having a plurality of windings, one of which is in circuit with said detector to initiate the vibration of the armature of said relay in response to detected signal pulses, means to produce a condenser discharge through another winding of said relay at the beginning and end of each signal pulse in order to accelerate the vibration of said armature, and means controlled by said armature for causing a current flow through another winding of said relay in such direction as to tend to hold the armature in the position to which it has been shifted.

In testimony whereof, I have signed my name to this specification this 19th day of October 1920.

RALPH WARNER DEARDORFF.